United States Patent [19]

Olcer

[11] Patent Number: 5,109,749
[45] Date of Patent: May 5, 1992

[54] EXPLOSIVELY ACTUATED SEPARABLE STRUCTURE

[75] Inventor: Nuri Y. Olcer, Englewood, Colo.

[73] Assignee: Oea, Inc., Denver, Colo.

[21] Appl. No.: 262,511

[22] Filed: Oct. 25, 1988

[51] Int. Cl.⁵ .......................... F42B 1/00; F42B 15/00
[52] U.S. Cl. ...................................... 89/1.14; 102/378
[58] Field of Search ................. 102/377, 378; 89/1.14, 89/1.57

[56] References Cited

U.S. PATENT DOCUMENTS

| | | | |
|---|---|---|---|
| 3,087,369 | 4/1963 | Butterfield | 411/391 |
| 3,139,031 | 6/1964 | Schroter et al. | 52/98 |
| 3,362,290 | 1/1968 | Carr et al. | 89/1.14 |
| 3,373,686 | 3/1968 | Blain et al. | 89/1.14 |
| 3,486,410 | 12/1969 | Drexelius et al. | 89/1.14 |
| 3,698,281 | 10/1972 | Brandt et al. | 89/1.14 |
| 3,975,981 | 8/1976 | Seifert | 89/1.14 |
| 4,106,875 | 8/1978 | Jewett | 102/49.5 |
| 4,648,227 | 3/1987 | Reusch | 102/378 |
| 4,685,376 | 8/1987 | Noel et al. | 89/1.14 |

FOREIGN PATENT DOCUMENTS 8707006 11/1987 PCT Int'l Appl. .

Primary Examiner—David H. Brown

[57] ABSTRACT

Explosively separable structure having two weakened areas in each of the structural members to be separated, one where the separation is to occur and the other spaced from the first. The second weakened area is stronger than the first, and the explosive charge is positioned between the two. Upon detonation of the explosive charge, the structural member bends in the stronger area after being severed primarily by shear and bending in the weaker one. In the embodiment disclosed, the areas of weakness are formed by a pair of notches or grooves positioned symmetrically with respect to each other on opposite sides of the structural member.

18 Claims, 1 Drawing Sheet

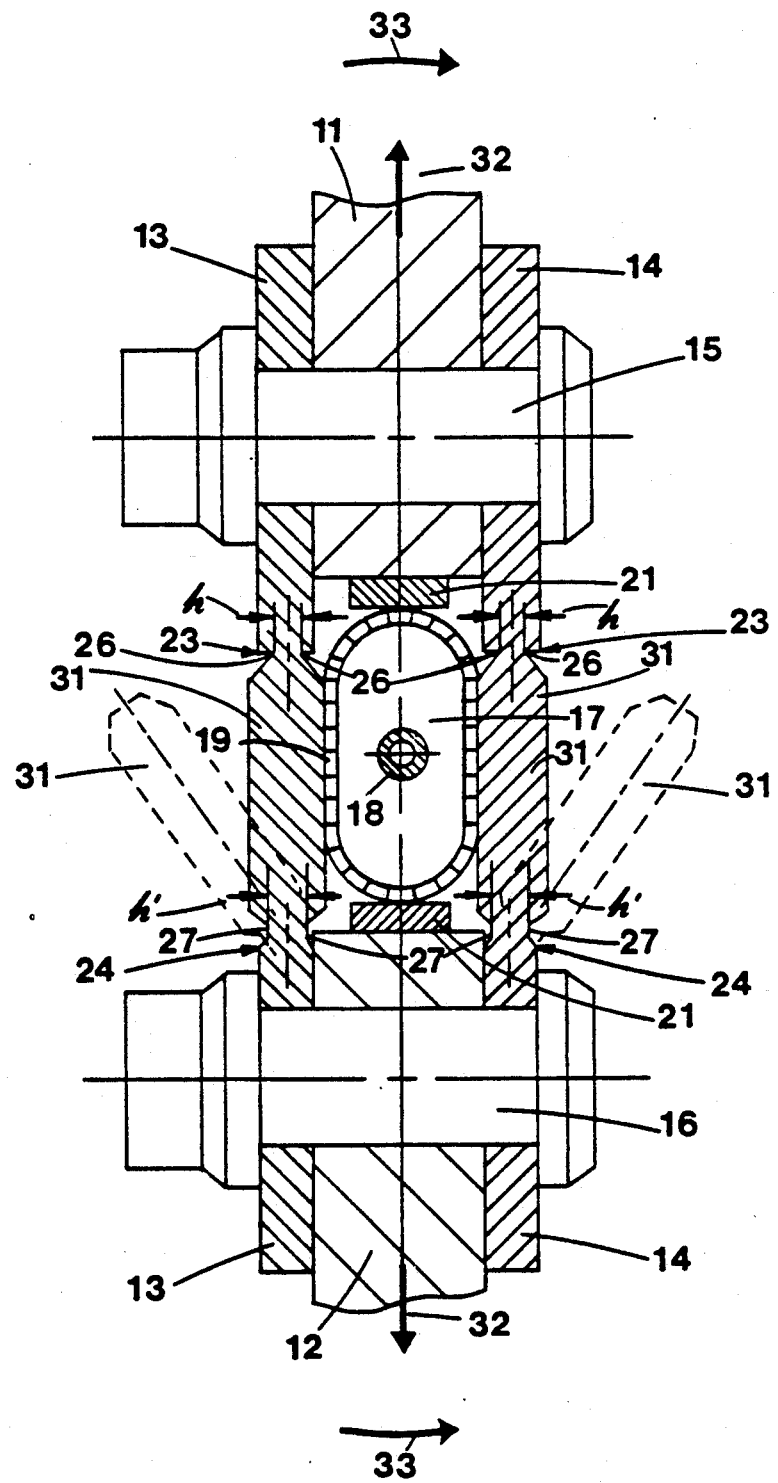

EXPLOSIVELY ACTUATED SEPARABLE STRUCTURE

This invention pertains generally to the separation of structural members and, more particularly, to a system in which portions of a structure are severed explosively.

Explosive severance devices are employed in a number of applications such as the separation of missile stages and the dispensing of submunitions. In such devices, it is important to control the detonation in order to obtain a complete separation of the components without damaging them. It is also important that the structure be strong enough to carry the prescribed loads until such time as separation is desired.

Explosive severance devices commonly employ an explosive charge within a metal tube which changes in volume and/or shape without rupturing upon detonation of the charge. The structural member to be severed is weakened by a groove or notch which extends along the desired line of separation, and the tube containing the explosive is positioned adjacent to the line of weakness. Examples of such devices are found in U.S. Pat. Nos. 3,486,410 and 3,698,281. The structural member is severed by a combination of shear, tension and bending upon detonation of the explosive charge. With these devices, there is a problem in that while the notch or groove reduces the amount of explosive force required to effect separation, care must be taken to avoid too much weakening of the structure which can lead to premature failure under the action of prescribed structural loads. If the notch or groove is not deep enough, it may be necessary to increase the amount of the explosive charge to the point that the expandable tube may rupture and damage the structural members upon detonation.

It is in general an object of the invention to provide a new and improved explosively separable structure.

Another object of the invention is to provide a structure of the above character which overcomes limitations and disadvantages of explosive severance devices heretofore provided.

Another object of the invention is to provide a structure of the above character which can be separated more effectively and is capable of carrying higher structural loads than explosively separable structures heretofore provided.

These and other objects are achieved in accordance with the invention by providing an explosively separable structure having two weakened areas in each of the structural members to be separated, one where the separation is to occur and the other spaced from the first. The second weakened area is stronger than the first, and the explosive charge is positioned between the two. Upon detonation of the explosive charge, the structural member bends in the stronger area after being severed primarily by shear and bending in the weaker one. In the embodiment disclosed, the areas of weakness are formed by pairs of notches or grooves positioned symmetrically with respect to each other on opposite sides of the structural member.

The single figure of drawing is a fragmentary sectional view of one embodiment of an explosively separable structure according to the invention.

In the drawing, the invention is illustrated in connection with two structural parts 11, 12, such as the bulkheads on adjacent stages of a missile, which are initially joined together but adapted to be separated. The two parts are connected together by a pair of separation plates 13, 14 which extend between the two parts on opposite sides thereof. The plates are affixed to the structural parts by suitable fasteners such as pins 15, 16. Parts 11, 12 and plates 13, 14 can be of any desired shape, e.g. planar or cylindrical, and pins 15, 16 are spaced along the overlapping portions of the respective structural parts and separation plates.

An explosively actuated expandable tube 17 is positioned in the space formed between the plates 13, 14 and the confronting ends of parts 11, 12. The expandable tube is of conventional design, and it includes an explosive cord 18 within a metal tube 19 which is generally oval-shaped in cross section, with two flat sides and two rounded sides.

Cushioning material 21, such as syntactic foam or another soft polymer, is positioned between the rounded sides of the metal tube and the ends of structural parts 11, 12 to prevent the tube from impacting upon the parts during actuation of the expandable tube. Such an impact would produce a flattening or cusping of the tube wall, which could weaken the wall and cause it to rupture. Thus, the isolation of the explosive device helps to prevent damage to the tube itself and to the surrounding structure. If desired, a plurality of discrete spacers or one or more springs, e.g. a flat metallic spring, can be utilized in place of a continuous layer of cushioning material to provide the desired isolation and cushioning.

Each of the separation plates 13, 14 has two areas of weakness 23, 24 located in an off-center position with respect to the expandable tube and on opposite sides of the tube. As discussed more fully hereinafter, areas 23 are weaker than areas 24, and upon explosive actuation, the plates pivot and bend about the stronger areas after severance of the weaker ones.

Each of the areas of weakness 23 is formed by a symmetrical pair of notches or grooves 26 which open through the inner and outer sides of the plate in which they are formed. Each of the areas 24 is formed by a pair of notches or grooves 27 which open through the inner and outer sides of the plate in which they are formed. The notches or grooves in each of the areas of weakness are symmetrically opposed, and the thickness h of the plates in areas 23 is less than the thickness h' in areas 24 (i.e., $h < h'$) so that the plates are stronger in areas 24 than in areas 23. Thus, the plates bend in areas 24 and sever in areas 23 upon detonation of the explosive charge in the expandable tube. The severing is produced primarily by a combination of shear and bending, with the portions 31 of the plates between the two areas of weakness being bent in an outward direction, as illustrated in phantom lines in the drawing.

The portions 31 of plates 13, 14 between the areas of weakness are thicker than the other portions of the plates. This additional thickness assures that the expanding tube bears only against the portions of the plates which are intended to be broken out, and this helps to prevent damage to other portions of the structure when the device is actuated. In the embodiment illustrated in the drawing, portions 31 are on the order of 30-35 per cent thicker than the remainder of the plates, and they can be thicker or thinner as long as they are thick enough to assure that they are the only portions of the plates which will be born against by the expanding tube.

The location of notches or grooves 26, 27 is important for proper operation of the device. In this regard, all of the notches or grooves are offset from the center-line of the expandable tube 17. Notches or grooves 26 are positioned so that their lower sides are no higher than the point of tangency between the flat sides and the upper rounded sides of the tube, and preferably below this point. Notches or grooves 27 are positioned as close to pins 16 as possible without interfering with the installation and/or functioning of the pins. Minimizing the distance between the notches or grooves and the pins assures that the structure will be as strong as possible outside the area designed to be broken away.

The invention has a number of advantages over prior art severance devices such as those found in U.S. Pat. Nos. 3,486,410 and 3,698,281. The off-center location of notches 26 relative to expandable tube 17 produces a combination of shear and bending in the plates at the notches, and less explosive energy is required than in devices where the notches are adjacent to the center of the tube and the members are severed by a combination of tension and bending.

The use of symmetrically positioned double notches to form the areas of weakness gives plates 13, 14 a greater ability to carry axial loads and resist bending moments (illustrated by arrows 32 and 33, respectively) than they would have if only single (unsymmetrical) notches were employed. The double notches eliminate unsymmetrical loading of the plates at the notches, with the result that tensile and compressive loads produce only tensile and compressive stresses at the areas of weakness 23. With single notches, tensile or compressive loads would, in addition, produce bending stresses, and the plates would have to be at least twice as thick in the areas of weakness in order to carry the same tensile and compressive loads. The amount of explosive energy required to sever the plates is dependent upon the thickness of the plates, and substantially less explosive energy is required to sever the double-notch plates than the single-notch plates of the same structural strength. Stated otherwise, the double-notch plates are at least twice as strong as the single-notch plates of the same web thickness h.

The additional areas of weakness 24, which act as hinges about which the severed portions of the plates can bend or rotate more easily during explosive actuation, further reduce the amount of explosive energy required to sever and rotate the plates. With the hinges and the off-center double notches, only about half as much explosive energy is required to sever plates of a given structural strength as would be required with a single, centered notch.

The cushioning material 21 or other cushioning means isolates and protects the relatively soft rounded sides of the expandable tube from the stiffer structural parts and prevents weakening and possible rupture of the tube in these areas during explosive actuation.

The isolation provided by the cushioning means and the reduction in the amount of explosive energy required to sever the plates also serve to reduce the high frequency vibrations, or pyroshock, produced in the surrounding structure upon actuation of the explosive in the expandable tube. These vibrations can be harmful to electronic, optical or mechanical equipment mounted to the structure. Reduction of the vibrations makes it possible to use the invention in a broader range of applications, including missile stage separation and submunitions dispensation.

In some applications, it may be desirable to eliminate areas of weakness 24 and form plates 13, 14 with areas 23 as the only areas of weakness. This will, however, require a somewhat greater explosive charge (e.g., about 10 per cent, or less) than applications in which the additional areas of weakness are employed.

It is apparent from the foregoing that a new and improved explosively separable structure has been provided. While only one presently preferred embodiment has been described in detail, as will be apparent to those familiar with the art, certain changes and modifications can be made without departing from the scope of the invention as defined by the following claims.

What is claimed is:

1. In an explosively actuated separable structure: a structural member having first and second portions adapted to be separated from each other, a pair of notches positioned opposite each other on opposite sides of the structural member forming a first weakened area between the first and second portions of the structural member, a second weakened area spaced from the first weakened area and being of greater strength than the first weakened area, and explosively actuated means for applying a force to the structural member between the first and second weakened areas to sever the structural member in the first area and bend the structural member in the second area to effect separation of the first and second portions of said member.

2. The structure of claim 1 wherein the structural member comprises a plate having the pair of notches positioned symmetrically on opposite sides thereof.

3. The structure of claim 1 wherein the explosively actuated means comprises a laterally expandable tube positioned laterally adjacent to the structural member between the areas of weakness.

4. The structure of claim 3 including cushioning means adjacent to the expandable tube for preventing impact of the tube against other portions of the structure.

5. In an explosively actuated separable structure: a plate member having a pair of opposing surfaces, a pair of aligned notches positioned symmetrically of each other on opposite sides of the plate member and opening through the opposing surfaces to form an area of weakness between first and second portions of said member, and explosively actuated means positioned on one side of the plate member adjacent to one of the opposing surfaces for applying a laterally directed force to the plate member to effect lateral separation of the first and second portions in the area of weakness.

6. The structure of claim 5 including a groove formed in the plate member to form an area of weakness about which the plate member can bend upon actuation of the explosively actuated means.

7. The structure of claim 5 wherein the explosively actuated means comprises a laterally expandable tube positioned laterally adjacent to the plate member at a position offset from the area of weakness.

8. The structure of claim 7 including cushioning means adjacent to the expandable tube for preventing impact of the tube against other portions of the structure.

9. In an explosively actuated separable structure: a pair of generally parallel structural members each having first and second portions adapted to be separated from each other, a pair of notches positioned opposite each other on opposite sides of each of the structural members forming a first weakened area in each of the structural members between the first and second portions thereof, a second weakened area spaced from the first weakened area in each of the structural members and being of greater strength than the first weakened area. and explosively actuated means positioned between the structural members for applying a force to the members between the first and second weakened areas to bend each of the members in the second area and sever each of the members in the first area to effect separation of the first and second portions of said members.

10. The structure of claim 9 wherein the structural members comprise plates each having the pair of notches positioned symmetrically on opposite sides thereof.

11. The structure of claim 9 wherein the explosively actuated means comprises a laterally expandable tube positioned between the areas of weakness in the respective structural members.

12. The structure of claim 11 including cushioning means adjacent to the expandable tube for preventing impact of the tube against other portions of the structure.

13. In an explosively actuated separable structure: first and second spaced apart plate members, a pair of aligned notches formed in each of the plate members and opening through opposite sides thereof to define areas of weakness between first and second portions of each of said members, and explosively actuated means positioned between the plate members for applying a laterally directed force to the plate members to effect separation of the first and second portions of said members in the areas of weakness.

14. In an explosively actuated separable structure: a structural member comprising a plate having first and second portions adapted to be separated from each other, a pair of notches positioned symmetrically of each other on opposite sides of the plate forming a first weakened area between the first and second portions of the plate, a pair of aligned grooves positioned symmetrically on opposite sides of the plate forming a second weakened area which is spaced from the first weakened area and of greater strength than the first weakened area, and explosively actuated means for applying a force to the plate between the first and second weakened areas to sever the plate in the first area and bend the plate in the second area to effect separation of the first and second portions of said plate.

15. In an explosively actuated separable structure: a pair of generally parallel plate members each having first and second portions adapted to be separated from each other, a pair of notches positioned symmetrically of each other on opposite sides of each of the plate members forming a first weakened area in each of the plate members between the first and second portions thereof, a pair of grooves positioned symmetrically of each other on opposite sides of each of the plate members forming a second weakened area in each of the plate members which is spaced from the first weakened area and of greater strength than the first weakened area, and explosively actuated means positioned between the plate members for applying a force to the members between the first and second weakened areas to sever each of the members in the first area and bend each of the members in the second area to effect separation of the first and second portions of said members.

16. In an explosively actuated separable structure: first and second spaced apart plate members, a pair of aligned notches formed in each of the plate members and opening through opposite sides thereof to define areas of weakness between first and second portions of each of said members, a pair of grooves positioned symmetrically of each other on opposite sides of each of the plate members to form additional areas of weakness about which the plate members can bend in response to a laterally directed force, and explosively actuated means comprising a laterally expandable tube offset in position from the areas of weakness and the additional areas of weakness for applying a laterally directed force to the plate members to effect separation of the first and second portions of said members in the areas of weakness.

17. The structure of claim 16 wherein the explosively actuated means comprises a laterally expandable tube offset in position from the areas of weakness and the additional areas of weakness.

18. The structure of claim 17 including cushioning means positioned between the plate members adjacent to the expandable tube for preventing impact of the tube against other portions of the structure.

* * * * *